United States Patent
Barbezat

(10) Patent No.: US 7,449,249 B2
(45) Date of Patent: Nov. 11, 2008

(54) SPRAY POWDER

(75) Inventor: Gérard Barbezat, Opfikon (CH)

(73) Assignee: Sulzer Metco AG, Wohlen (CH)

( * ) Notice: Subject to any disclaimer, the term of this patent is extended or adjusted under 35 U.S.C. 154(b) by 353 days.

(21) Appl. No.: 11/205,247

(22) Filed: Aug. 15, 2005

(65) Prior Publication Data

US 2006/0063023 A1 Mar. 23, 2006

(30) Foreign Application Priority Data

Sep. 17, 2004 (EP) ................... 04405593

(51) Int. Cl.
- B32B 15/20 (2006.01)
- B32B 15/01 (2006.01)
- B05D 1/02 (2006.01)
- B05D 1/08 (2006.01)
- C22C 9/04 (2006.01)
- C22C 9/02 (2006.01)

(52) U.S. Cl. ............... 428/674; 428/553; 428/615; 427/42; 75/247; 75/255

(58) Field of Classification Search ............ None
See application file for complete search history.

(56) References Cited

U.S. PATENT DOCUMENTS

| | | | |
|---|---|---|---|
| 6,334,914 B2 * | 1/2002 | Sakai et al. | 148/433 |
| 6,475,635 B1 | 11/2002 | Sakai et al. | |
| 6,770,381 B2 * | 8/2004 | Kanayama et al. | 428/626 |
| 6,933,054 B2 * | 8/2005 | Ohla et al. | 428/472.2 |
| 2001/0021353 A1 | 9/2001 | Sakai et al. | |
| 2003/0008169 A1 | 1/2003 | Sakai et al. | |
| 2004/0241038 A1 * | 12/2004 | Hofmann et al. | 420/472 |

FOREIGN PATENT DOCUMENTS

| | | |
|---|---|---|
| DE | 19801074 A1 | 7/1999 |
| DE | 19908107 A1 | 8/2000 |
| DE | 10159949 C1 | 5/2003 |
| EP | 0407569 A1 | 1/1991 |
| EP | 0776986 A1 | 6/1997 |
| EP | 0962541 A1 | 12/1999 |
| JP | 57092171 | 6/1982 |
| JP | 02034763 | 2/1990 |
| JP | 08174272 | 7/1996 |
| WO | WO 03/033752 A1 | 4/2003 |

OTHER PUBLICATIONS

JP 62297429 English Abstract, Miyake, Dec. 1987.*
JP 62274036 English Abstract, Miyake et al, Nov. 1987.*

* cited by examiner

Primary Examiner—Keith D. Hendricks
Assistant Examiner—Jason L Savage
(74) Attorney, Agent, or Firm—Townsend and Townsend and Crew, LLP

(57) ABSTRACT

The invention relates to a spray powder for coating a substrate (2), in particular for coating a bearing part (2) of a bearing apparatus, the spray powder having at least the following composition: zinc=5% to 30% by weight, tin=1% to 10% by weight, silicon=0.1% to 3% by weight, aluminum=0.1% to 7% by weight, iron=0.01% to 2% by weight, manganese=0.01% to 4% by weight, cobalt=0.01 to 3% by weight, copper=the balance to 100% in % by weight.

14 Claims, 1 Drawing Sheet

SPRAY POWDER

BACKGROUND OF THE INVENTION

The invention relates to a spray powder, a copper-containing surface layer produced with the spray powder, in particular a surface layer on a bearing part of a bearing apparatus, and also a method for the application of such a surface layer.

Bearing apparatus of all kinds, for example sliding bearings and rolling element bearings, account for the majority of bearings used in technology. In the following the term bearing or bearing apparatus is used for all bearing parts defining the function of the bearing which cooperate in supporting contact, for example bearing parts rolling on each other, or sliding on each other or supported in each other.

As a rule signs of wear are associated with the friction arising on the bearing running surfaces cooperating in supporting contact, particularly at the bearing running surfaces. In order that these signs of wear do not necessitate a change of the complete bearing apparatus, bearing shells are used—among other things—in sliding bearings, which can be exchanged depending on their degree of wear. However this complicates the construction of the sliding bearing considerably and moreover an expensive service procedure is necessary to change the bearing shells.

Sliding bearings, in particular split sliding bearings with bearing shells, are often used for the bearings of shafts. The combined bearing is also sometimes used in sliding and rolling element bearings. As a rule the shafts are forged out of forged steels or cast iron with spherical graphite, and the counter parts are forged out of heat-treatable steel or sintered materials or are sometimes also manufactured from malleable cast iron. The bearing shells are mostly realized as so-called two-layer or three-layer bearings. The manufacture of bearing shells of this kind is relatively expensive however. With long running lifetimes of the engine the bearing shells wear out to such an extent that the replacement of the bearing shells ultimately becomes necessary, with the replacement of the bearing shells in engines such as these being associated with high costs, as has already been mentioned.

However in other kinds of bearings, in ball bearings for example, the premature wear of the bearing parts, for example the balls of the ball bearings, an axle to be journalled by the ball bearing, a cage for the balls of the ball bearing, or other bearing parts of the ball bearing, is a basic problem which involves considerable expenditure for repairs and servicing and is ultimately associated with considerable costs.

SUMMARY OF THE INVENTION

It is therefore an object of the present invention to improve the anti-friction characteristics of a surface of a bearing part and to propose an improved and constructionally simpler bearing apparatus which has a considerably longer working life.

Thus the invention relates to a spray powder for coating a substrate, in particular for coating a bearing part of a bearing apparatus, the spray powder having at least the following composition: zinc=5% to 30% by weight, tin=1% to 10% by weight, silicon=0.1% by weight, aluminum=0.1% to 7% by weight, iron=0.01% to 2% by weight, manganese=0.01% to 4% by weight, cobalt=0.01 to 3% by weight, copper=balance in % by weight.

In accordance with the invention a spray powder is thus made available with which a copper-containing surface layer can be applied to a substrate by means of a thermal coating process. In this arrangement decisive ingredients of the powder in accordance with the invention are, on the one hand, iron, cobalt, manganese and silicon, which precipitate out in the form of a hard phase as intermetallic phases or compounds in a layer sprayed using the spray powder in accordance with the invention, on cooling of the liquid powder sprayed onto a workpiece, so that more less isolated regions occur in the layer, which form spatially more or less isolated hard phases of the intermetallic phases already mentioned or of intermetallic compounds of iron, cobalt, manganese and silicon. The hard phases form relatively hard regions, i.e. regions with a high degree of hardness in the otherwise relatively soft copper-containing base matrix which is essentially composed of copper, aluminum and zinc, and thus form a copper-aluminum zinc base matrix which forms a soft copper-containing base matrix relative to the enclosed regions of the hard phases.

As will be explained in more detail later on, the spray powder in accordance with the invention is thus particularly suitable for coating the surface of a workpiece, the surface cooperating with another surface in supporting contact since, on the one hand, the soft copper-containing base matrixes considerably improve the sliding characteristics of the surface layer and, on the other hand, the regions with hard phases enclosed in the copper-containing layer stabilize the soft copper-containing base matrix considerably and locally endow the layer with the necessary hardness, so that not only are the sliding characteristics of the layer considerably improved, but also the surface layer offers a very good protection against mechanical loads and wear. Thus, for example, a surface of a bearing saddle for a shaft or the bearing region of a counterpart can be advantageously provided with such a layer.

In a preferred embodiment the spray powder additionally contains 0.01% to 1% by weight titanium. In this arrangement titanium also moves as an additional component into the intermetallic phase or into the intermetallic compound and thus leads to a further increase in the hardness of the hard phases so that a surface layer sprayed with this spray powder is even better protected against wear.

In order to achieve particularly good results in thermal spraying, the particle size of the spray powder lies particularly advantageously between 5 µm and 120 µm, preferably between 10 µm and 60 µm, and is preferably manufactured by means of conveying through nozzles in gas or water, by sintering, by spray drying or by mechanical alloying.

The spray powder is particularly suitable for the thermal spraying of a surface layer onto a workpiece which cooperates with another workpiece in supporting contact.

According to the invention a copper-containing surface layer applied by means of thermal spraying, in particular a bearing layer of a bearing part of a bearing apparatus, has at least the following composition: zinc=5% to 30% by weight, tin=1% to 10% by weight, silicon=0.1% to 3% by weight, aluminum=0.1% to 7% by weight, iron=0.01% to 2% by weight, manganese=0.01% to 4% by weight, cobalt=0.01 to 3% by weight, copper=balance in % by weight.

As has already been explained, a surface layer in accordance with the invention has more or less isolated hard phases of iron, cobalt, manganese and silicon, which additionally also contain titanium and correspondingly form spatially more or less isolated regions. These hard phases form relatively hard regions, i.e. regions with a high degree of hardness in the otherwise relatively soft copper-containing layer which is essentially formed by the base matrix of copper, aluminum and zinc. The hardness of this hard phase can for example amount to between 300 HV and 500 HV, wherein HV means Vickers hardness as usual, and preferably to approximately 400 HV, whereas the copper-containing base matrix in the regions outside the hard phases can have a hardness between 80 HV and 200 HV, preferably a hardness of approximately 100 HV, with the surface layer preferably being a base matrix of α-copper.

In this arrangement the copper-containing base matrix results not only in a considerable improvement of the gliding characteristics, with both dry lubrication and also lubrication between two bearing parts which is provided by a wet lubricant, but also in an increased life of a bearing whose parts cooperate in supporting contact. Since the copper-containing base matrix has a relatively low degree of hardness, in other words is relatively soft, this can take up particularly hard foreign bodies which enter between the bearing parts of the bearing, in that the foreign bodies are pushed into the soft copper alloy of the copper matrix, so that the surfaces of the bearing parts are protected against damage by the hard foreign bodies. This means that the soft copper-containing base matrix filters the hard foreign bodies out, as it were; i.e. the foreign bodies are embedded in the copper-containing base matrix permanently.

Thus, for example, the surface layer of a wet lubricated bearing is particularly advantageously provided with a surface layer in accordance with the invention. Bearings such as these are lubricated with a lubricating oil, as a rule which can contain impurities of all kinds, such as abraded material for example, which can arise at many different places in the engine. Corresponding filter apparatuses are admittedly often provided, such as the oil filter in a gasoline or diesel engine of a motor vehicle; however, only particles of a certain size can be effectively filtered out of the lubricant using this. Smaller particles of micrometer size in particular are not filtered out at all or only insufficiently, so that they enter between the parts of the shaft which are in supporting contact and lead in the long run to damage to these bearings. However, if the corresponding surfaces are provided with a surface layer in accordance with the invention, the damaging impurities are incorporated into the soft copper-containing surface layer in the working of the bearing, so that the surfaces cooperating in supporting contact are no longer damaged by the impurities, in other words by the contaminating particles or the foreign bodies.

In an embodiment which is particularly important in practice the surface layer has a porosity of 0.5% to 5% by volume, in particular between 1% and 3%. This porosity has very advantageous effects on sliding characteristics between two bearing parts cooperating in supporting contact, in particular in wet lubricated bearings, since the pores form storage pockets for lubricating oil, so that even under difficult lubricating conditions there is always enough lubricant for lubricating the bearing parts. In this arrangement it has been shown that a porosity of 0.5% to 5% by volume, in particular between 1% and 3%, has a particularly favorable effect, so that by this means the lubrication between the bearing parts is further improved not only in the case of inadequate lubrication but also in the case of hydrodynamic lubrication.

A surface layer in accordance with the invention is advantageously finished by honing in order to increase its quality and/or to adapt to special geometric requirements.

A particular advantage results for a bearing apparatus known from the prior art which additionally has a bearing shell between two bearing parts to be supported. Bearing shells are used in shafts for example and are, as is well-known to the person averagely skilled in the art, arranged between the shaft itself and in a bearing recess which is formed in the bearing saddle. The bearing shells themselves are manufactured from a material which has a lower hardness than the shaft for example, so that first and foremost the bearing shells are subject to increased wear during operation, so that a corresponding wear to the shaft itself can be reduced and the bearing saddle is subject to practically no wear by friction because the shaft does not cooperate directly with the bearing saddle, but rather with the bearing shell. In bearing apparatuses such as these this means that it is imperative for a bearing shell to be provided, since otherwise the shaft itself and/or the bearing saddle would wear out in a relatively short time and thus practically the whole bearing with the bearing saddle and shaft would have to be exchanged, whereas, if a bearing shell is additionally provided, only the shell bearing has to be exchanged.

It is obvious that a bearing with a bearing shell is relatively complicated and thus expensive and that the exchange of the bearing shells is associated with considerable effort and expense.

However, in contrast, if a bearing part of a bearing apparatus is provided with a surface layer in accordance with the invention, a shell bearing can be completely dispensed with, since the surface layer in accordance with the invention protects the bearing parts against wear, so that a bearing shell, which serves for the protection of the bearing parts in a known bearing apparatus, can be dispensed with.

Finally the invention relates to a spray method for the manufacture of a surface layer in accordance with the invention, using a spray powder in accordance with the invention, on a bearing part of a shaft bearing of an engine, in particular an atmospheric plasma spray method, a vacuum plasma spray method, a HVOF method, a flame spray method or a cold gas spray method.

BRIEF DESCRIPTION OF THE DRAWINGS

The invention will be explained in more detail in the following with the help of the drawing.

DESCRIPTION OF THE PREFERRED EMBODIMENTS

Figure 1:
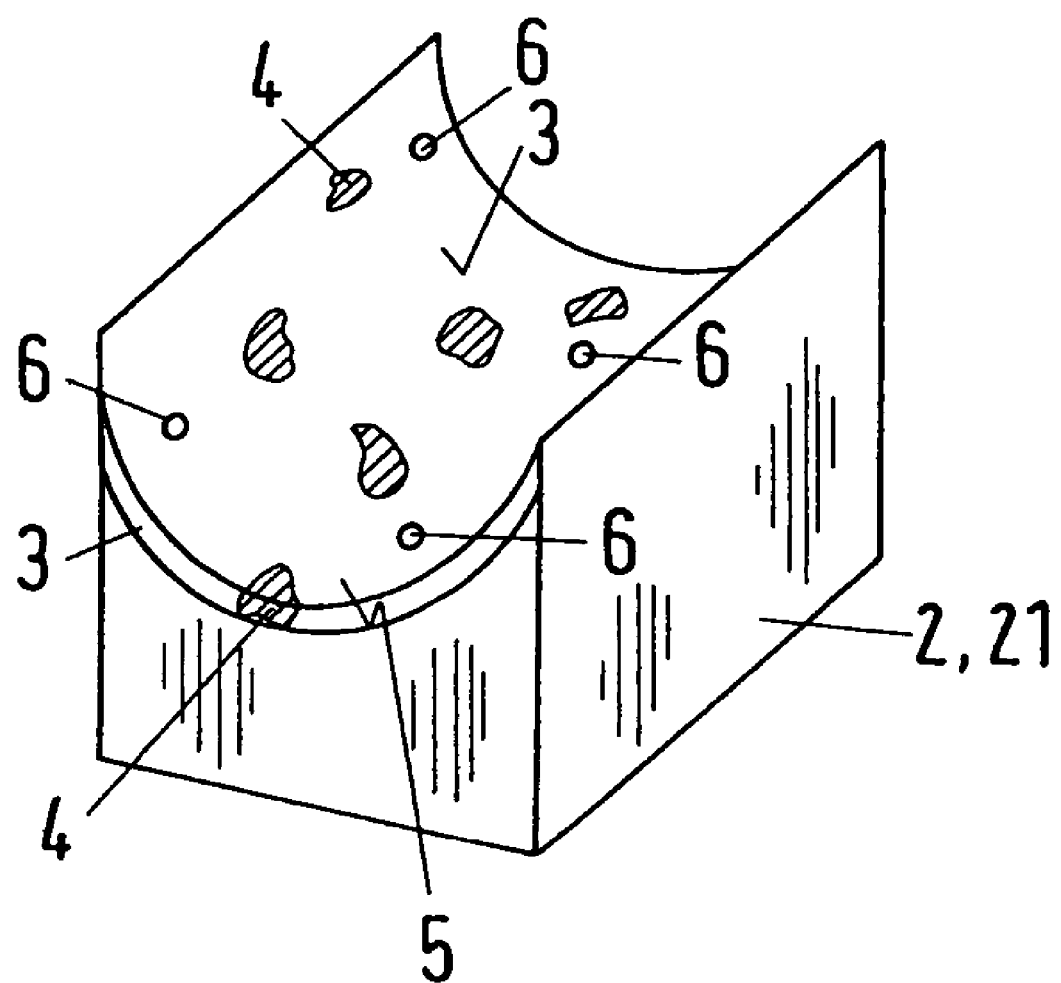
FIG. 1 shows a bearing part of a shaft bearing with a surface layer in accordance with the invention.

FIG. 1 shows a schematic illustration of a bearing part 2 of a shaft with a surface layer 3 in accordance with the invention in section. This shows a section through a bearing saddle 21 of a shaft bearing for an engine. The bearing saddle 21 has bearing surface 5 which is provided with a surface layer 3 in accordance with the invention. The surface layer 3 includes regions 4, which are formed from hard phases of iron, cobalt, manganese and silicon and eventually also contain titanium and which endow the layer with the necessary resistance to mechanical wear, with, on the one hand, the soft, copper-containing, base matrix of the surface layer 3 increasing the sliding ability of a shaft (not illustrated here) on the surface layer 3 and, on the other hand, being suitable for embedding contaminating particles. Contaminating particles can, for example, be transported to the shaft bearing by a lubricating oil for example, with the lubricating oil being forced by a non-illustrated oil pump in a manner known per se through the lubricating oil openings 6 between the surface of the bearing saddle 21 and the likewise not illustrated shaft journalled therein. As a result of the surface layer 3, a shell bearing is superfluous in the shaft bearing illustrated in FIG. 1, since, on the one hand, the surface layer 3 protects the surface layer 5 of the bearing saddle 21 from wear during operation, for example by means of friction with the shaft, and, on the other hand, the sliding ability of the shaft on the surface 3 is improved to such an extent by the copper-containing base matrix that a bearing shell, such as those known and necessary in crankshafts in the prior art, is no longer necessary.

Thus a spray powder for coating a bearing part of a bearing apparatus by means of thermal spraying is made available by the invention. In this arrangement a characteristic of the surface layers sprayed using the spray powder in accordance with the invention is that the copper-containing surface layer in accordance with the invention not only results in a considerable improvement of the sliding characteristics both with dry lubrication and also with lubrication between two bearing parts, which is effected by a wet lubricant, but also the embedded hard phases clearly increase the durability of the bearing, the bearing parts of which cooperate in supporting contact. The reason for this is, among other things, that any contaminating particles become embedded in the soft copper-containing base matrix which is located between two bearing parts, and the copper-containing base thereby binds them so that they cannot cause any more damage to the surfaces of the bearing parts. In this arrangement the copper-containing surface layer in accordance with the invention has, at the same time, a sufficiently high degree of hardness due to the hard phases that the coated bearing part is so excellently protected against wear, for example by friction, that bearing shells such as are necessary in the prior art—in particular in shaft bearings or other bearings—can be dispensed with. Thus not only the working life of bearing parts known per se and of the corresponding bearings is clearly increased as a whole, but it also becomes possible to considerably simplify the design of certain known bearing apparatuses.

The invention claimed is:

1. A spray powder for coating a substrate consisting of:
Zinc=5% to 30% by weight
Tin=1% to 10% by weight
Silicon=0.1% to 3% by weight
Aluminum=0.1% to 7% by weight
Iron=0.01% to 2% by weight
Manganese=0.01% to 4% by weight
Cobalt=0.01% to 3% by weight
Copper=the balance to 100% in % by weight.

2. A spray powder in accordance with claim 1 wherein the size of the particles of the spray powder lies between 5 μm and 120 μm.

3. A spray powder in accordance with claim 2 wherein the particles have a size between 10 μm and 60 μm.

4. A spray powder in accordance with claim 1 wherein the spray powder is made available by means of passage through a nozzle in gas or in water, sintering, spray drying or mechanical alloying.

5. A spray powder for coating a substrate consisting of:
Zinc=5% to 30% by weight
Tin=1% to 10% by weight
Silicon=0.1% to 3% by weight
Aluminum=0.1% to 7% by weight
Iron=0.01% to 2% by weight
Manganese=0.01% to 4% by weight
Cobalt=0.01% to 3% by weight
Titanium=0.01% to 1% by weight
Copper=the balance to 100% in % by weight.

6. A copper-containing surface layer applied by thermal spraying, the surface layer consisting of:
Zinc=5% to 30% by weight
Tin=1% to 10% by weight
Silicon=0.1% to 3% by weight
Aluminum=0.1% to 7% by weight
Iron=0.01% to 2% by weight
Manganese=0.01% to 4% by weight
Cobalt=0.01% to 3% by weight
Copper=the balance to 100% in % by weight.

7. A surface layer in accordance with claim 6, wherein the surface layer has a base matrix of α-copper mixed crystals.

8. A surface layer in accordance with claim 6, wherein the surface layer has precipitations of iron and/or cobalt and/or manganese and/or silicon as a hard phase.

9. A surface layer in accordance with claim 6, wherein the surface layer has a porosity of 0.5% to 5% by volume.

10. A surface layer in accordance with claim 9 wherein the surface layer has a porosity between 1% and 3%.

11. A surface layer in accordance with claim 6 which is finished by means of honing.

12. A spraying process for the manufacture of a surface layer in accordance with claim 6, for the manufacture of a surface layer on a bearing part of a shaft bearing, wherein the spraying process is a thermal spraying process.

13. A spraying process in accordance with claim 12 wherein the thermal spraying process is one of an atmospheric plasma spraying process, a vacuum plasma spraying process, a HVOF-process, a flame spraying process and a cold gas spraying process.

14. A copper-containing surface layer applied by thermal spraying, the surface layer consisting of:
Zinc=5% to 30% by weight
Tin=1% to 10% by weight
Silicon=0.1% to 3% by weight
Aluminum=0.1% to 7% by weight
Iron=0.01% to 2% by weight
Manganese=0.01% to 4% by weight
Cobalt=0.01% to 3% by weight
Titanium=0.01% to 1% by weight
Copper=the balance to 100% in % by weight.

* * * * *